June 26, 1962   N. CAPELLARO ET AL   3,040,977
FUNCTION CONTROL MECHANISM FOR MANUAL ADDING MACHINES
Filed Sept. 8, 1960                                           2 Sheets-Sheet 1
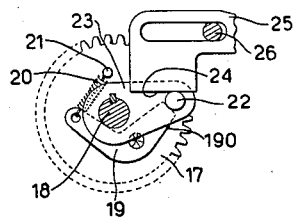
Fig. 2
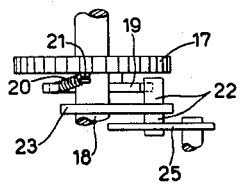
Fig. 3
Fig. 1
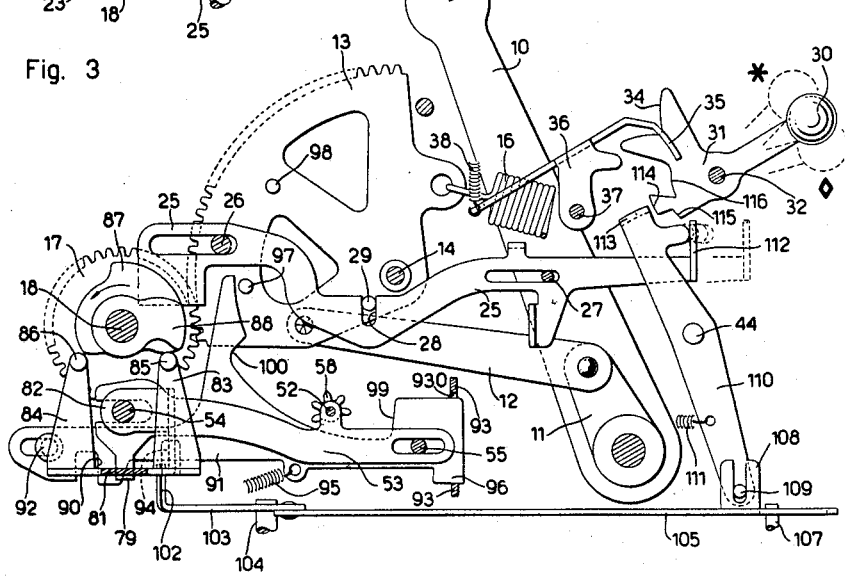
INVENTORS
NATALE CAPELLARO
& TERESIO GASSINO
BY
Kenyon & Kenyon
ATTORNEYS

United States Patent Office 3,040,977
Patented June 26, 1962

3,040,977
FUNCTION CONTROL MECHANISM FOR MANUAL ADDING MACHINES
Natale Capellaro and Teresio Gassino, Ivrea, Italy, assignors to Ing. C. Olivetti & C., S.p.A., Ivrea, Italy, a corporation of Italy
Filed Sept. 8, 1960, Ser. No. 54,669
Claims priority, application Italy Sept. 14, 1959
9 Claims. (Cl. 235—60)

The present invention relates to manual adding and like business machines whose main operating mechanism is driven by a reciprocable handle through a one-cycle clutch which is disengaged during the forward stroke of the handle and is engaged during the return stroke thereof.

More particularly, the invention relates to those machines having manipulative function predetermining means controlled thereby for conditioning the machine according to a predetermined function.

In total taking operations ensuing the manipulation of said predetermining means some preliminary machine functions, such as the engagement of the register with the actuators and the selection of either the adding or subtracting register wheels according to the character of the total represented by the register, should be effected prior to the operation of said actuators. In conventional machines said preliminary functions are usually effected by suitable function conditioning means in a so-called blank-cycle. In order to avoid the need for said blank-cycle it has been devised to effect the preliminary functions during the total taking cycle proper. To this end means are provided for sensing the manipulative predetermining means at the beginning of the machine cycle to accordingly control the function conditioning means. Therefore, the machine cycle is always very intricate and the machine speed is lowered because a substantial extent of time should be necessarily allowed to the machine cycle to master all the involved functions.

Another solution of the problem has been that of actuating the function conditioning means by spring power stored at each machine cycle and released upon manipulation of the predetermining means. However, this solution makes the touch of the manipulative means, such as keys, very disagreeable.

The primary object of the present invention is to provide a manual adding machine obviating the above mentioned advantages. A further object of the invention is to provide a manual adding machine wherein the preliminary machine functions are not effected, during the machine cycle, without however affecting the touch of manipulative means.

According to the invention in a manual adding machine having a main handle reciprocable through a forward and a return stroke, a main operating mechanism, and a clutch for causing a one-cycle drive of said mechanism by said handle, said clutch being disengaged during said forward stroke and being engaged during said return stroke, we now provide the combination of manipulative function predetermining means, means controlled by said manipulative means and operable for conditioning the machine according to the predetermined function, and means driven by said handle during said forward stroke for operating said conditioning means.

Other objects, features and advantages of the invention will become apparent from the following detailed description of a preferred embodiment thereof, made with reference to the accompanying drawings, wherein:

FIG. 1 is a left-hand longitudinal partial sectional view of a manual adding machine embodying the function control mechanism according to the invention;

FIG. 2 is a left-hand longitudinal partial sectional view of a detail of FIG. 1;

FIG. 3 is a plan view of FIG. 2;

Driving Device

Figure 4:
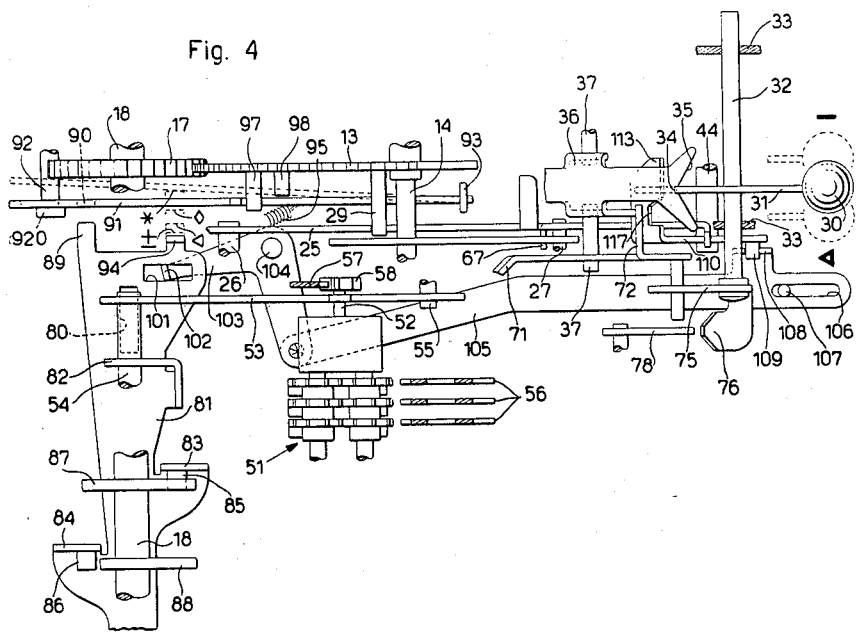
FIG. 4 is a partial plan view of the machine.

The driving device of the machine is similar to that described in applicant's copending application Serial Number 767,370 filed October 15, 1958, now abandoned. With reference to FIG. 1, the numeral 10 indicates the conventional handle of a manual adding machine, said handle being reciprocable through a forward and a return stroke. Secured to the handle 10 is an arm 11 connected to a toothed sector 13 by means of a link 12. The sector 13 is fulcrumed on a stationary shaft 14 and is urged clockwise by a main spring 16. The sector 13 engages a toothed wheel 17 rotatably mounted on a main shaft 18 which forms the main operating mechanism of the machine and which is adapted to be rotated counterclockwise.

A clutch is provided for causing a one-cycle drive of the main shaft 18 by the handle 10, said clutch comprising a pawl 19 (FIGS. 2 and 3) pivoted on the wheel 17 and a pin 22 mounted on an arm 23 secured to the main shaft 18. The pawl 19 is normally urged by a spring 20 tensioned between one end of the pawl 19 and a pin 21 secured to the wheel 17 to contact the shaft 18. Through the toothed sector 13 the main spring 16 urges the wheel 17 counterclockwise thus causing the other end of the pawl 19 to contact the pin 22 which in turn contacts the lower edge 24 of a slide 25. In this manner the main shaft 18 is locked at rest. The slide 25 is horizontally slidable on two stationary pins 26 and 27 (FIG. 1) and is provided with a vertical slot 28 engaging a pin 29 secured to the sector 13.

Upon rocking the handle 10 clockwise through its forward stroke the sector 13 is rocked counterclockwise by the link 12, thus on one hand tensioning the main spring 16 and on the other hand turning the wheel 17 clockwise. The pawl 19 then leaves the pin 22, thus disengaging the clutch, while the slide 25 is shifted rightwards. The edge 24 thus slides on the pin 22 which remains stationary together with the arm 23 and the shaft 18.

Toward the end of the forward stroke of the handle 10, when the sector 13 has driven the wheel 17 through nearly one revolution, the back edge 190 of the pawl 19 reaches the pin 22, whereby first the pawl 19 is slightly rocked counterclockwise and then it springs clockwise under the pin 22 into the initial position shown in FIG. 2. Therefore, upon completion of the forward stroke the clutch has been engaged. Meanwhile, the pin 22 has been released by the edge 24 during the latter portion of the rightward shifting of the slide 25.

When the handle 10 is released, the main spring 16 rocks the sector 13 clockwise which turns the wheel 17 counterclockwise. Through the clutch 19, 22 the arm 23 and the main shaft 18 are now rocked through one full revolution until the pin 22 is stopped by the edge 24 of the slide 25, which meanwhile has been restored leftwards.

Function Predetermining Device

With reference to FIGS. 1 and 4, the machine functions are predetermined by manipulative predetermining means comprising a single key 30 secured to a lever 31 which in turn is secured to a shaft 32. This is slidably and rotatably mounted on the conventional machine frame 33 (FIG. 4). The lever 31 is provided with a V- shaped edge 34 cooperating with a similarly shaped edge 35 perpendicular to the edge 34 and formed on a lever 36 pivotally mounted on a stationary shaft 37 and urged clockwise (FIG. 1) by a spring 38. The lever 31 is further provided with an edge 114, 115, 116 stepped according to the machine functions to be conditioned.

As will be described hereinafter, if the handle 10 is operated when the key 30 is in its central position shown in FIGS. 1 and 4, the machine will effect an adding cycle. If the key 30 is shifted rightwards or leftwards, respectively (upwards or downwards, respectively, as seen in FIG. 4), a subtract or a non-add cycle, respectively, will be predetermined. If the key 30 is rocked counterclockwise or clockwise, respectively, as seen in FIG. 1, a total or a subtotal taking cycle, respectively, will be predetermined. The key 30 is thus adapted to predetermine both amount entering and total taking operations.

Whenever the key 30 is moved from its central position to any one of the above four positions the edge 34 causes the lever 36 to be rocked counterclockwise against the urge of the spring 38, whereupon the key 30 is locked in its new position in a known manner until completion of the machine cycle.

Means are provided for sensing the stepped edge 114, 115, 116 of the manipulative means 30, 31. Said sensing means comprise a sensing lug 113 (FIG. 1) of a lever 110 pivoted on a stationary shaft 44 and normally locked in an ineffective position by a lug 112 of the slide 25 against the urge of a spring 111. A pin 109 of the lever 110 engages a slotted lug 108 bent over a function conditioning means such as a slide 105 slidably mounted by means of a slot 106 (FIG. 4) on a stationary pin 107 and linked to a lever 103 pivoted at 104 on the machine frame.

When during the forward stroke of the handle 10 the slide 25 (FIG. 1) is shifted rightwards, its lug 112 releases the lever 110, thus rendering the sensing lug 113 effective. The lug 113 will now sense the stepped edge 114, 115, 116 of the lever 31 and set the slide 105 according to the function predetermined by the key 30, said lug being thus settable both for amount entering and total taking operations, as will be described hereinafter. During the return stroke of the handle 10 the lever 110 together with the slide 105 will be restored in their ineffective position by the lug 112 of the slide 25.

*Add-Subtract Control Device*

The adding machine of the invention comprises a set of conventional vertical actuators 56 (FIG. 4) differentially reciprocable through a forward and a return stroke, and a register 51 engageable with said set of actuators 56. The register 51 is of the known type formed of two sets of intermeshing register wheels adapted both for positive and negative amount entering operations. The register 51 is secured to a pin 52 (FIGS. 1, 4 and 5) rockably mounted on a slide 53. This is horizontally slidable on a pair of shafts 54 and 55 for engaging and disengaging the set of register wheels facing the set of actuators 56, and from said set, respectively.

Figure 5:
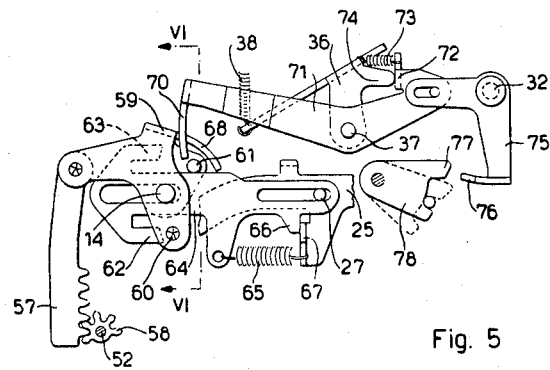
FIG. 5 is another left-hand longitudinal partial sectional view of the machine.

As usual, the register 51 may be rocked through 180 degrees about the axis of the pin 52 by means of an add-subtract control device comprising a vertical rack 57 (FIG. 5) engaging a pinion 58 secured to the pin 52. The rack 57 is pivoted on a function conditioning means, such as a bail 59, controlled by the manipulative means. More particularly, the bail 59 is both rockable and slidably mounted on the shaft 14 and is provided with a projection 68 engaging a cam slot 69 (FIG. 6) of a lug 70 bent over a lever 71 pivoted on the shaft 37 (FIG. 5). A spring 73 normally urges the lever 71 to contact by means of a bent lug 72 a projection 74 of the lever 36.

The bail 59 is operable for conditioning the machine according to the predetermined function. More particularly, the bail 59 is provided with a pair of pins 60 and 61 (FIGS. 5 and 6) adapted to selectively cooperate with a corresponding pair of projections 62, 63 (FIG. 5) of a slide 64 slidably mounted on the shaft 14 and on the stationary pin 27. A spring 65 urges the slide 64 to normally contact by means of a projection 66 a bent lug 67 of the slide 25. Normally the cam slot 69 keeps the pin 60 of the bail 59 out of the vertical plane of the slide 64 and the pin 61 on said plane.

The lever 71 is pin-and-slot connected to a lever 75 pivoted on the shaft 32 but not slidable along same. A lug 76 of the lever 75 is adapted to cooperate with a finger 77 of an index member 78 known per se and adapted to indicate the character of an amount represented by the register 51. Such an index member is described for instance, in the United States Patent 2,754,052 issued July 10, 1956, to Natale Capellaro. If said amount is positive the member 78 will be in the position shown by full lines in FIG. 5, if said amount is negative the member 78 will be in the position shown by broken lines in FIG. 5. It will be further assumed that when the register 51 is in its adding position, the rack 57 will be in its upper position shown in FIG. 5.

The mode of operation of the add-subtract control device is as follows.

When during the forward stroke of the handle 10 (FIG. 1) the slide 25 is shifted rightwards, it drives through the spring 65 (FIG. 5) the slide 64 which thus operates the add-subtract control device during the forward stroke of the handle 10.

More particularly, assuming the register is in the adding position, the bail 59 will be in its clockwise rocked position shown in FIG. 5. If the handle 10 is operated when the key 30 is in its central position shown in FIGS. 1 and 4 for predetermining an adding cycle, the projection 62 of the slide 64 will not meet the pin 60 and the register 51 will remain in its adding position. If, on the contrary, the key 30 is shifted to its subtract position (FIG. 4) the shaft 32 will shift the lever 75 transversely, thus removing the lug 76 from the vertical plane of the index member 78 (FIG. 4). Furthermore, the lever 31 will rock the lever 36 counterclockwise together with the lever 71 (FIG. 5). The lug 70 of the lever 71 is thus lowered and the cam slot 69 shifts the bail 59 rightwards as seen in FIG. 6, whereby the pin 60 is placed into the path of the projection 62 and the pin 61 is removed from the vertical plane of the projection 63.

When the slide 64 is driven rightwards during the forward stroke of the handle 10 the projection 62 engages the pin 60 and rocks the bail 59 counterclockwise. The rack 57 is thus lowered and rocks the register 51 through 180 degrees into its subtracting position. When the slide 64 is then returned leftwards by the slide 25 during the return stroke of the handle 10 the projections 62, 63 do not affect the position of the bail 59.

Figure 6:
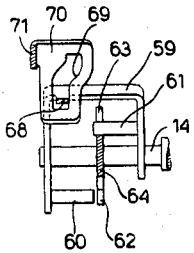
FIG. 6 is a partial sectional view taken on the line VI—VI of FIG. 5.

When upon completion of the machine cycle the key 30 is restored together with the levers 36 and 71, the bail 59 returns to its leftward position shown in FIG. 6, but it remains rocked counterclockwise with respect to the position shown in FIG. 5. If the next following cycle is an adding cycle the lever 71 will not be rocked counterclockwise and the projection 63 of the slide 64 will engage the pin 61 and return the bail 59 to its adding position shown in FIG. 5.

If the key 30 (FIG. 1) is rocked counterclockwise or clockwise to its total taking or subtotal taking position, respectively, the lever 36 is rocked counterclockwise as above, but the lug 76 of the lever 75 remains in the vertical plane of the index member 78. If the amount represented by the register 51 is positive the finger 77 will arrest the lug 76 after a short stroke, thus preventing the levers 75 and 71 from being further rocked by the spring 73. The register 51 will thus be set to the adding position in the manner above described. If the amount represented by the register 51 is negative the finger 77 will not arrest the lug 76 and the lever 75 enables the lever 71 to rock counterclockwise together with the lever 36. The register 51 will thus be set to the subtracting position in the manner above described.

It will be apparent that the add-subtract control device is always operated before starting the cycle of the main shaft 18, whereby the reciprocation of the actuators may begin without delay upon starting said cycle and the machine speed will be increased.

*Register Engaging and Disengaging Device*

A suitable register engaging and disengaging device is provided as usually to cause the register 51 to engage with and disengage from the actuators 56 when required for performing the predetermined operation. This device comprises an intermediate member formed of a plate 81 (FIGS. 1 and 4) having a lug 82 rockably and slidably mounted on the shaft 54. The plate 81 is formed with a first slot 80 engaging a projection 79 (FIG. 1) of the slide 53 supporting the register 51 (FIG. 4), and with a second slot 101 engaging a lug 102 of the lever 103.

The plate 81 is further provided with a pair of lugs 83 and 84 having a pair of pins 85, 86 cooperating with a pair of cam members 87 and 88, respectively, secured to the main shaft 18. Furthermore, the plate 81 is provided with a projection 89 (FIG. 4) adapted to engage a slot 90 (FIG. 1) of a means driven by the handle 10 such as a reciprocating member or slide 91 slidably mounted on a stationary shaft 92 and in a slot 930 of a portion 93 of the machine frame. A vertical lug 94 (FIG. 4) of the plate 81 is adapted to engage the slide 91 in order to slightly rock same about the slot 930 of the frame 93, as shown by broken lines in FIG. 4. A spring 95 normally urges the slides 91 to contact a flange 920 of the shaft 92 and a projection 96 (FIG. 1) of the slide 91 to contact the lower edge of the slot 930.

Means such as a pair of elements or pins 97 and 98 are provided to be driven by the handle 10 for operating the slide 91. More particularly, the pins 97 and 98 are secured to the toothed sector 13, whereby they are connected to the handle 10. Towards the end of the forward stroke of the handle 10 the pin 97 engages a shoulder 99 of the slide 91 which is thus moved rightwards from its ineffective position shown in FIGS. 1 and 4 until it springs downwards and is locked by the left edge of the projection 96 against the right edge of the frame 93 in an effective position.

The two pins 97 and 98 are selectable to return the reciprocating slide 91 to its ineffective position. To this end the pin 98 is shorter than the pin 97 and is normally out of the vertical plane of the slide 91. If the slide 91 is in the position shown by full lines in FIG. 4, at the end of the return stroke of the handle 10 and thus of the return stroke of the actuators 56, the pin 97 engages a shoulder 100 (FIG. 1) of the slide 91, thus first raising the slide 91 and disengaging the projection 96 from the frame 93 and then restoring the slide 91. If, however, the slide 91 has been previously rocked to the position shown by broken lines in FIG. 4, the shoulder 100 has been placed into the path of the shorter pin 98 which will engage said shoulder 100 and restore the slide 91 substantially upon half return stroke of the handle 10. The pin 98 will thus return the slide 91 already at the end of the forward stroke of the actuators.

The mode of operation of the register engaging and disengaging device is as follows.

If the key 30 is either in its central adding position or it has been shifted to its subtracting position (FIG. 4), during the forward stroke of the handle 10 the lug 113 will be arrested by the edge portion 114 (FIG. 1) of the lever 31 after a stroke of a minimum extent. Thus the slide 105 (FIG. 4) through the lever 103 substantially does not move the plate 81, whereby the plate 81 is unaffected by the reciprocation of the slide 91.

During the return stroke of the handle 10 the shaft is rotated and the cam members 87 and 88 will engage the associated pins 85 and 86, respectively, thus rocking the plate 81 first counterclockwise (FIG. 1) and then clockwise. By means of the projection 79 the slide 53 is thus shifted first rightwards, whereby it engages the register 51 (FIG. 4) with the actuators 56 at the end of their forward stroke, and then back leftwards, whereby it disengages the register 51 from the actuators 56 at the end of their return stroke.

If the key 30 has been rocked clockwise (FIG. 1) to its subtotal taking position, during the forward stroke of the handle 10 the lug 113 will be arrested by the edge portion 115 of the lever 31 after a stroke of a certain extent. Therefore, the lever 110 through the slide 105 and the lever 103 shifts now the plate 81 upwards as seen in FIG. 4 along the shaft 54, thereby removing the pins 85 and 86 from the vertical planes of the associated cam members 87 and 88 and engaging the projection 89 into the slot 90 of the slide 91, without, however, causing the lug 94 to engage the slide 91.

Towards the end of the forward stroke of the handle 10 the pin 97 shifts the slide 91 rightwards (FIG. 1). The slide 91 through the projection 89 rocks now the plate 81 to engage the register 51 with the actuators 56 before starting the main shaft 18, thus the machine cycle, and the projection 96 locks the slide 91 in its rightward position. Towards the end of the return stroke of the handle 10 the pin 97 will restore the slide 91, whereby the plate 81 will disengage the register 51 from the actuators 56 at the end of their return stroke.

If the key 30 has been rocked counterclockwise (FIG. 1) to its total taking position, during the forward stroke of the handle 10 the lug 113 will be arrested by the edge portion 116 of the lever 31 after a stroke of the maximum extent. The plate 81 is now shifted so far as to cause the projection 89 to engage the slot 90 and the lug 94 to engage the slide 91, which will thus be rocked to the position shown by broken lines in FIG. 4.

Towards the end of the forward stroke of the handle 10 the slide 91 is shifted rightwards by the pin 97 and the register 51 is engaged with the actuators before starting the machine cycle as in the preceding case. The slide 91 is now returned by the shorter pin 98, whereby the register 51 is disengaged from the actuators 56 at the end of their forward stroke.

From the above described mode of operation it will be clear that the sensing means 113 when effective causes the intermediate member 81 to be moved into engagement with the reciprocating member 91 both to be operated thereby instead of by the main operating mechanism and to select the elements 97, 98.

At last if the key 30 has been shifted downwards as seen in FIG. 4 to its non add position, a recess 117 in the lug 113 is placed in the vertical plane of the lever 31. During the forward stroke of the handle 10 the lug 113 (FIG. 1) is now arrested by the edge portion 114 of the lever 31 after a stroke of an extent intermediate the minimum extent and the certain extent seen above.

The plate 81 is shifted so far as to removed the pins 85 and 86 from the vertical plane of the cam members 87 and 88 but without causing the projection 89 to engage the slot 90. In this case the plate 81 will be operated neither by the slide 91 nor by the cam members 87 and 88 and the register will remain unaffected during this machines cycle.

Obviously many changes, modifications and embodiments may be made without departing from the scope of the invention.

What we claim is:

1. In a manual adding machine having a main handle reciprocable through a forward and a return stroke, a rotary main operating mechanism, and a clutch for causing a one-cycle drive of said mechanism by said handle, said clutch being disengaged during said forward stroke and being engaged during said return stroke, the combination of manipulative function predetermining means, means controlled by said manipulative means and operable for conditioning the machine according to the predetermined function, and means driven by said handle during said forward stroke for operating said conditioning means.

2. In a manual adding machine having a handle reciprocable through a forward and a return stroke, a rotary main operating mechanism, and a clutch for causing a one-cycle drive of said mechanism by said handle, said clutch being disengaged during said forward stroke and being engaged during said return stroke, the combination of manipulative function predetermining means, normally ineffective means for sensing said manipulative means, and means operated by said handle during said forward stroke for rendering said sensing means effective.

3. In a manual adding machine having a handle reciprocable through a forward and a return stroke, a rotary main operating mechanism, and a clutch for causing a one-cycle drive of said mechanism by said handle, said clutch being disengaged during said forward stroke and being engaged during said return stroke, the combination of manipulative function predetermining means, normally ineffective means for sensing said manipulative means, means controlled by said sensing means and operable for conditioning the machine according to the predetermined function, means operated by said handle during said forward stroke for rendering said sensing means effective, and a reciprocating member driven by said handle during said forward stroke for operating said conditioning means.

4. In a manual adding machine having a handle reciprocable through a forward and a return stroke, a rotary main operating mechanism, and a clutch for causing a one-cycle drive of said mechanism by said handle, said clutch being disengaged during said forward stroke and being engaged during said return stroke, the combination of manipulative function predetermining means, an operable add-subtract control device, and means driven by said handle during said forward stroke for operating said device under the control of said manipulative means.

5. In a manual adding machine having a handle reciprocable through a forward and a return stroke, a rotary main operating mechanism, a clutch for causing a one-cycle drive of said mechanism by said handle, said clutch being disengaged during said forward stroke and being engaged during said return stroke, and a register, the combination of manipulative function predetermining means, an index member adapted to indicate the character of an amount represented by said register, an operable add-subtract control device, and means driven by said handle during said forward stroke for operating said device under the control of said manipulative means and said index member.

6. In a manual adding machine having a handle reciprocable through a forward and a return stroke, a rotary main operating mechanism, a clutch for causing a one-cycle drive of said mechanism by said handle, said clutch being disengaged during said forward stroke and being engaged during said return stroke, a set of actuators, and a register engageable with said set of actuators, the combination of function conditioning means settable both for amount entering and total taking operations, a register engaging device controlled by said conditioning means, means driven by said mechanism for operating said device when said conditioning means are set for amount entering operations, and a reciprocating member driven by said handle during said forward stroke for operating said device when said conditioning means are set for total taking operations.

7. In a manual adding machine having a handle reciprocable through a forward and a return stroke, a rotary main operating mechanism, a clutch for causing a one-cycle drive of said mechanism by said handle, said clutch being disengaged during said forward stroke and being engaged during said return stroke, a set of actuators and a register engageable with said actuators, the combination of manipulative means for predetermining both amount entering and total taking operations, normally ineffective means for sensing said manipulative means, means operated by said handle during said forward stroke for rendering said sensing means effective, a register engaging device, and means controlled by said sensing means when effective and driven either by said mechanism for operating said device when amount entering operations are predetermined by said manipulative means or by said handle when total taking operations are predetermined by said manipulative means.

8. In a manual adding machine having a handle reciprocable through a forward and a return stroke, a rotary main operating mechanism, a clutch for causing a one-cycle drive of said mechanism by said handle, said clutch being disengaged during said forward stroke and being engaged during said return stroke, a set of actuators, and a register engageable with said actuators, the combination of manipulative function predetermining means, normally ineffective means for sensing said manipulative means, means operated by said handle during said forward stroke for rendering said sensing means effective, a register engaging and disengaging device having an intermediate member normally adapted to be operated by said mechanism, and a reciprocating member driven by said handle, said sensing means when effective being adapted to cause said intermediate member to be operated by said reciprocating member instead of by said mechanism.

9. In a manual adding machine having a handle reciprocable through a forward and a return stroke, a rotary main operating mechanism, a clutch for causing a one-cycle drive of said mechanism by said handle, said clutch being disengaged during said forward stroke and being engaged during said return stroke, a set of actuators, and a register engageable with said actuators, the combination of manipulative function predetermining means, normally ineffective means for sensing said manipulative means, means operated by said handle during said forward stroke for rendering said sensing means effective, a register engaging and disengaging device having an intermediate member normally adapted to be operated by said mechanism, a reciprocating member moved by said handle towards the end of said forward stroke from an ineffective position to an effective position, and a pair of elements connected to said handle and selectable to return said reciprocating member to said ineffective position, said sensing means when effective causing said intermediate member to be moved in engagement with said reciprocating member both to be operated thereby instead of by said mechanism and to select said elements.

References Cited in the file of this patent

UNITED STATES PATENTS

| | | |
|---|---|---|
| 2,116,653 | Armbruster | May 10, 1938 |
| 2,744,682 | Busch | May 8, 1956 |